United States Patent
Qian et al.

(10) Patent No.: US 12,104,350 B2
(45) Date of Patent: Oct. 1, 2024

(54) SPEED DETERMINATION METHOD, ELECTRONIC DEVICE AND COMPUTER STORAGE MEDIUM

(71) Applicant: Beijing Baidu Netcom Science and Technology Co., LTD., Beijing (CN)

(72) Inventors: Lingfeng Qian, Beijing (CN); Pinxin Long, Beijing (CN); Liangjun Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 29 days.

(21) Appl. No.: 17/594,519

(22) PCT Filed: Nov. 26, 2020

(86) PCT No.: PCT/CN2020/131688
§ 371 (c)(1),
(2) Date: Oct. 20, 2021

(87) PCT Pub. No.: WO2021/258628
PCT Pub. Date: Dec. 30, 2021

(65) Prior Publication Data
US 2023/0160174 A1    May 25, 2023

(30) Foreign Application Priority Data
Jun. 26, 2020 (CN) .......................... 202010593107.7

(51) Int. Cl.
*E02F 3/43* (2006.01)
*G05D 1/00* (2006.01)
*G05D 1/02* (2020.01)

(52) U.S. Cl.
CPC ........... *E02F 3/435* (2013.01); *G05D 1/0223* (2013.01)

(58) Field of Classification Search
CPC ......... E02F 3/435; E02F 3/437; E02F 9/2203; E02F 9/265; E02F 9/205; E02F 9/2033;
(Continued)

(56) References Cited

U.S. PATENT DOCUMENTS

| 9,587,369 B2 | 3/2017 | Fletcher et al. | |
| 2015/0308073 A1* | 10/2015 | Voelz | E02F 9/2033 |
| | | | 701/50 |

(Continued)

FOREIGN PATENT DOCUMENTS

| CN | 105040768 A | 11/2015 |
| CN | 109778939 A | 5/2019 |

(Continued)

OTHER PUBLICATIONS

International Search Report and Written Opinion received for International Patent Application No. PCT/CN2020/131688 mailed on Mar. 24, 2021, 7 pages.

*Primary Examiner* — Anne Marie Antonucci
*Assistant Examiner* — Connor L Knight
(74) *Attorney, Agent, or Firm* — MORRISON & FOERSTER LLP

(57) ABSTRACT

A speed determination method, an electronic device and a computer storage medium are provided, relates to the field of computer technology, and may be applied to the field of artificial intelligence, especially the field of automated driving. The method includes: determining an expected speed direction of a controlled point of a first controlled target according to an actual location of the controlled point of the first controlled target and a preset trajectory of the controlled point of the first controlled target, wherein the first controlled target is one of a plurality of controlled targets having a kinematic relationship; and determining a target speed of at least one controlled target of the plurality of controlled targets according to the expected speed direction of the
(Continued)

controlled point of the first controlled target and the kinematic relationship.

18 Claims, 4 Drawing Sheets

(58) Field of Classification Search
CPC . E02F 9/2004; E02F 9/262; E02F 3/43; E02F 3/841; E02F 9/2045; E02F 3/7613; E02F 9/2041; G05D 1/0223; G06F 30/15; G06F 17/12; G06F 17/16; G06F 30/17; G06F 30/20
See application file for complete search history.

(56) References Cited

U.S. PATENT DOCUMENTS

| | | | | |
|---|---|---|---|---|
| 2015/0322647 | A1* | 11/2015 | Danko | G05B 13/021 700/275 |
| 2020/0224384 | A1* | 7/2020 | Suzuki | E02F 3/435 |
| 2021/0222405 | A1* | 7/2021 | Velde | E02F 9/2033 |
| 2021/0318688 | A1* | 10/2021 | Yoshimoto | G05D 1/0223 |
| 2022/0098835 | A1* | 3/2022 | Yoshimoto | E02F 3/439 |

FOREIGN PATENT DOCUMENTS

| | | |
|---|---|---|
| CN | 109972688 A | 7/2019 |
| CN | 110409528 A | 11/2019 |
| CN | 110455290 A | 11/2019 |
| CN | 111749289 A | 10/2020 |
| CN | 111753374 A | 10/2020 |

\* cited by examiner

SPEED DETERMINATION METHOD, ELECTRONIC DEVICE AND COMPUTER STORAGE MEDIUM

CROSS-REFERENCE TO RELATED APPLICATION

The present disclosure is a National Stage application of PCT international application PCT/CN2020/131688, filed on Nov. 26, 2020, which claims priority to Chinese Patent Application No. 202010593107.7, filed with the Chinese Patent Office on Jun. 26, 2020 and entitled "SPEED DETERMINATION METHOD AND APPARATUS, DEVICE AND COMPUTER STORAGE MEDIUM", both of which are incorporated herein by reference in their entireties.

TECHNICAL FIELD

The present disclosure relates to the field of artificial intelligence, especially the field of automatic driving, and in particular, to a speed determination method and apparatus, an electronic device and a computer-readable storage medium.

BACKGROUND

An excavator, also known as a navvy, is an earth-moving machine that uses a bucket to excavate materials above or below a bearing surface and load them into a transport vehicle or unload them to a stockyard. With the development of artificial intelligence technology, the excavator may also achieve an unmanned operation.

SUMMARY

For at least one problem in the related technology, a speed determination method and apparatus, an electronic device and a computer-readable storage medium are provided according to embodiments of the present disclosure.

According to an aspect of the present disclosure, there is provided a speed determination method, including:
determining an expected speed direction of a controlled point of a first controlled target according to an actual location of the controlled point of the first controlled target and a preset trajectory of the controlled point of the first controlled target, wherein the first controlled target is one of a plurality of controlled targets having a kinematic relationship; and
determining a target speed of at least one controlled target of the plurality of controlled targets according to the expected speed direction of the controlled point of the first controlled target and a kinematic relationship.

According to another aspect of the present disclosure, there is provided an electronic device, including:
at least one processor; and
a memory communicatively connected with the at least one processor, wherein
the memory stores instructions executable by the at least one processor, and the instructions, when executed by the at least one processor, enable the at least one processor to perform the method according to any embodiment of the present disclosure.

According to another aspect of the present disclosure, there is provided a non-transitory computer-readable storage medium storing computer instructions, wherein the computer instructions cause a computer to perform the method according to any embodiment of the present disclosure.

In one embodiment of the present disclosure, the expected speed direction of the controlled point of the first controlled target is determined according to the actual location of the controlled point of the first controlled target and the preset trajectory of the controlled point of the first controlled target, and then the target speed of the at least one controlled target is determined according to the expected speed direction of the controlled point of the first controlled target.

BRIEF DESCRIPTION OF THE DRAWINGS

The accompanying drawings are used to better understand the solution, and do not constitute a limitation to the present disclosure, wherein.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

According to an embodiment of the present disclosure, there is provided a speed determination method, which can be applied to a plurality of controlled targets having a kinematic relationship, and used to determine a speed of a controlled target. In this method, a control parameter of the controlled target is determined by calculating an angular speed of the controlled target, so as to realize the accurate control of the controlled target of a device.

Figure 1:
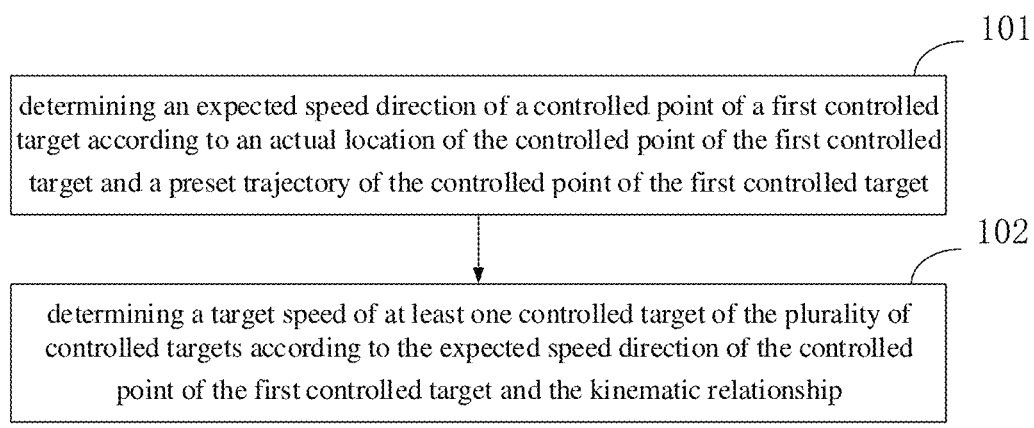
FIG. 1 is a schematic diagram of a speed determination method according to an embodiment of the present disclosure.
Figure 2:
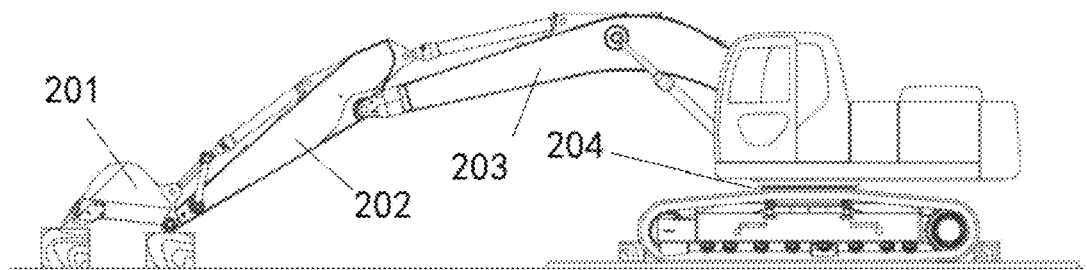
FIG. 2 is a schematic diagram of an excavator according to another embodiment of the present disclosure.

An embodiment of the present disclosure first provides a speed determination method, as shown in FIG. 1, including:
step 101, determining an expected speed direction of a controlled point of a first controlled target according to an actual location of the controlled point of the first controlled target and a preset trajectory of the controlled point of the first controlled target, wherein the first controlled target is one of a plurality of controlled targets having a kinematic relationship; and
step 102, determining a target speed of at least one controlled target of the plurality of controlled targets according to the expected speed direction of the controlled point of the first controlled target and the kinematic relationship.

In the embodiment of the present disclosure, the controlled targets having the kinematic relationship may be controlled targets that can be expressed by a certain equation with a motion parameter, such as a linear speed, an angular speed, an acceleration, etc. For example, a device includes three controlled targets, and a relationship between linear speeds of the three controlled targets conforms to a set group of ternary equations.

In this embodiment, the actual location of the controlled point of the first controlled target may be a location of a target part of the first controlled target. For example, the controlled device is an excavator, the first controlled target is a bucket, and the actual location of the controlled point of the first controlled target is an actual location of an end of the bucket.

In this embodiment, the preset trajectory of the controlled point of the first controlled target may be a pre-generated trajectory that can be executed by the first controlled target, and position coordinates of points in the trajectory are defined by a parameter t, namely:

$$\begin{cases} x = f_1(t) \\ y = f_2(t); \\ z = f_3(t) \end{cases}$$

In subsequent operations, a target point closest to the first controlled target on the preset trajectory of the controlled point of the first controlled target is calculated by a parameter equation of the preset trajectory of the controlled point of the first controlled target.

As an implementation, in this embodiment, the plurality of controlled targets of the device may be converted into a linkage mechanism or a crank-rocker mechanism by means of the mechanical principle conversion.

In the embodiment of the present disclosure, the first controlled target may be one of the plurality of controlled targets of the device, and there is a kinematic relationship between the plurality of controlled targets. A speed of a controlled target may be an angular speed or a linear speed of the controlled target.

In the embodiment of the present disclosure, a speed direction of the first controlled target is specifically expressed by a vector.

In this embodiment, the determining a target speed of at least one controlled target of the plurality of controlled targets may refer to: determining a target angular speed of one controlled target of the plurality of controlled targets of the device, namely, an expected value of an angular speed of the one controlled target.

Alternatively, the determining a target speed of at least one controlled target of the plurality of controlled targets may also refer to: determining respective target angular speeds of two or more controlled targets of the plurality of controlled targets of the device, namely, expected values of angular speeds of the two or more controlled targets.

Alternatively, the determining a target speed of at least one controlled target may also refer to: determining respective target angular speeds of all controlled targets of the device, namely, expected values of angular speeds of all the controlled targets.

The solution provided by this embodiment, after the determining a target speed of at least one controlled target of the plurality of controlled targets, may further include: determining a control parameter corresponding to the at least one controlled target according to the target speed of the at least one controlled target, and controlling the at least one controlled target by using the control parameter corresponding to the at least one controlled target. The determining a control parameter corresponding to the at least one controlled target according to the target speed of the at least one controlled target may refer to: determining the control parameter of the at least one controlled target according to a correspondence between an angular speed of the at least one controlled target and the control parameter, and controlling the at least one controlled target by using the control parameter.

For example, this embodiment is applied to a device, and the device may include controlled targets A, B, C, and D. These four controlled targets are controlled by separate control apparatuses. The first controlled target is A, and an expected speed direction of a controlled point of A is determined according to an actual location of the controlled point of A. Angular speeds of A, B, C, and D are determined according to a kinematic relationship between linear speeds or angular speeds of the four controlled targets of A, B, C, and D and the expected speed direction of the controlled point of A. The actual location of the controlled point of A is an actual location of a certain part of A. For example, in the case that A is a bucket of an excavator, the actual location of the controlled point of A may be an end of the bucket.

In this embodiment, after the target speed of the at least one controlled target is obtained, the control parameter of the at least one controlled target may be determined according to the target speed, and then the at least one controlled target may be controlled according to the control parameter.

In an example of this embodiment, the method is applied to an excavator, and further, the excavator may be an unmanned excavator. The first controlled target is a bucket 201, and other controlled targets of the excavator include a boom 203, a bucket rod 202, and a slewing support 204 of the excavator. Speaking of a speed direction of an end of the bucket, a mechanism of the excavator responds slowly, and thus there is a time lag greater than 300 ms; to compensate for the time lag, the actual location of the controlled point of the first controlled target requires an advance compensation. The advance compensation of the actual location (angle) of the controlled point may be achieved through the following equations:

$$\theta'_{swing} = \theta_{swing} + \omega_{swing} \times m;$$

$$\theta'_{boom} = \theta_{boom} + \omega_{boom} \times m;$$

$$\theta'_{stick} = \theta_{stick} + \omega_{stick} \times m;$$

$$\theta'_{bucket} = \theta_{bucket} + \omega_{bucket} \times m.$$

In the above equations, $\theta'_{swing}$ is a virtual angle of the slewing support of the excavator; $\theta_{swing}$ is an actual angle of the slewing support of the excavator; $\omega_{swing}$ is an actual angular speed of the slewing support of the excavator; m may be obtained by calculating a size of each mechanism; $\theta'_{boom}$ is a virtual angle of the boom of the excavator; $\theta_{boom}$ is an actual angle of the boom of the excavator; $\omega_{boom}$ is an actual angular speed of the boom of the excavator; $\theta'_{stick}$ is a virtual angle of the bucket rod; $\theta_{stick}$ is an actual angle of the bucket rod; $\omega_{stick}$ is an actual angular speed of the bucket rod; $\theta'_{bucket}$ is a virtual angle of the bucket; $\theta_{bucket}$ is an actual angle of the bucket; and $\omega_{bucket}$ is an actual angular speed of the bucket. After the virtual angle of each mechanism is obtained by calculation, the virtual angle of the mechanism is used to calculate a virtual location P' of the end of the bucket by means of the forward kinematics. Then the speed direction of the end of the bucket is from the virtual location P to the target point, and the vector is [a, b, c]$^T$. The virtual angle may be an angle at which a corresponding mechanism should be theoretically.

In the foregoing embodiment, the speed of the at least one controlled target of the plurality of controlled targets is determined according to the expected speed direction of the controlled point of the first controlled target of the plurality of controlled targets and the kinematic relationship between speeds of the plurality of controlled targets. In this way, a control parameter of a control mechanism of a controlled target may be determined subsequently according to the speed, to control the controlled target accurately, so that the controlled target can be at a corresponding location on the preset trajectory of the controlled point of the first controlled target at a set moment.

In another embodiment of the present disclosure, considering that there may be a difference between the preset trajectory of the controlled point of the first controlled target and the actual trajectory of the controlled point of the first controlled target, the speed direction of the first controlled target may be determined according to the actual location of the controlled point of the first controlled target and the expected location of the first controlled target on the preset trajectory.

Specifically, in step 101, the determining an expected speed direction of a controlled point of a first controlled target according to an actual location of the controlled point of the first controlled target and a preset trajectory of the controlled point of the first controlled target includes:

determining an adjacent point, which is closest to the actual location of the controlled point of the first controlled target, on the preset trajectory of the controlled point of the first controlled target;

determining a target point, whose distance from the adjacent point is a set distance value, on the preset trajectory of the controlled point of the first controlled target; and taking a direction of a vector from the actual location of the controlled point to the target point as the expected speed direction of the controlled point of the first controlled target.

In this embodiment, the determining a target point, whose distance from the adjacent point is a set target distance value, on the preset trajectory of the controlled point of the first controlled target may specifically refer to: determining the target point, whose distance from the adjacent point is the set distance value, in a forward direction of the preset trajectory of the controlled point of the first controlled target.

In an implementation of this embodiment, the method is applied to an excavator, and the controlled targets include a bucket, a boom, a bucket rod, and a slewing support of the excavator. An adjacent point that is closest to a current location point of an end of the bucket is found on the trajectory according to the current location point. The first controlled target may be a bucket, a vector including the location point of the end of the bucket and a point that is closest to the preset trajectory of the controlled point of the first controlled target should be perpendicular to a tangent vector of the adjacent point, and the adjacent point is determined based on the relationship. Based on this relationship, the adjacent point, which is closest to the end of the bucket, of the preset trajectory of the controlled point of the first controlled target may be calculated by a geometric or algebraic method.

In this embodiment, the speed direction of the first controlled target is determined according to the preset trajectory of the controlled point of the first controlled target, the actual location of the controlled point of the first controlled target, and the set target distance, so that the calculated speed of the at least one controlled target is related to the preset trajectory of the controlled point of the first controlled target and the actual location of the current controlled point. This helps to correct a deviation between the actual location of the controlled point of the first controlled target and the preset trajectory of the controlled point of the first controlled target timely during the control process.

In another embodiment of the present disclosure, the device may include a plurality of controlled targets. Speeds of some or all of the plurality of controlled targets may be calculated to control the device precisely. Specifically, the determining a target point, whose distance from the adjacent point is a set distance value, on the preset trajectory of the controlled point of the first controlled target includes:

determining the set distance value according to the actual location of the controlled point of the first controlled target; and determining a point ahead of the adjacent point by the set distance value in a movement direction of the adjacent point on the preset trajectory of the controlled point of the first controlled target as the target point.

This embodiment is applied to an excavator, and further, the excavator may be an unmanned excavator. The controlled targets include a bucket, a boom, a bucket rod, and a slewing support of the excavator. The target speed is a target angular speed. In the preset trajectory of the controlled point of the first controlled target, in the case that the slewing support is stationary, the first controlled target is the bucket; and the determining a target point, whose distance from the adjacent point is a set distance value, on the preset trajectory of the controlled point of the first controlled target includes:

determining the set distance value according to an actual location of the end of the bucket; and determining the point ahead of the adjacent point by the set distance value in the movement direction of the adjacent point on the preset trajectory of the end of the bucket as the target point.

Specifically, an actual angular speed of the bucket rod is determined according to the actual location of the end of the bucket; the set distance value is determined according to the actual angular speed of the bucket rod; and then the point ahead of the adjacent point by the set distance value in the movement direction of the adjacent point on the preset trajectory of the controlled point of the first controlled target (namely, the end of the bucket) as the target point.

In this embodiment, the target point is on the preset trajectory of the controlled point of the first controlled target, and is ahead of the closest point in the movement direction of the closest point, and a distance between the target point and the closest point is the set distance value.

In the case that the slewing support of the excavator is stationary, three mechanisms of the boom, the bucket, and the bucket rod move, and the moving range is in a plane where the three mechanisms are located. In this case, a speed of the slewing support is 0, only speeds of the three mechanisms of the boom, the bucket, and the bucket rod need to be determined, and the target point is determined based on the location of the bucket.

In this embodiment, the end point of the entire trajectory is the final target point. In an execution process, a target point closer to the current location point of the end of the bucket may be set at each moment, namely, the target point of the controlled point of the first controlled target in this embodiment, and then a speed of the at least one controlled target at the current moment is calculated according to the target point of the first controlled target.

This example refers to a habit of a human operator when performing excavator actions. The manual operator controls a handle of the bucket rod to be constant, uses the bucket rod as an active arm, and uses the bucket and the boom as random arms. Therefore, a closest distance between the target point and the preset trajectory of the controlled point of the first controlled target is calculated according to an angle of the bucket rod. The set distance value L between the point that is closest to the first controlled target and the target point on the preset trajectory of the controlled point of the first controlled target may be calculated from an actual angular speed $w_{stick}$ of the bucket rod. In an example, the set distance value L can be calculated by the following formula:

$$L = W_{stick} \times k + b;$$

wherein k and b in the formula are used to adjust a linear relationship between the angular speed of the bucket rod and the distance L.

In another implementation, the first controlled target may also be a bucket rod or a slewing support.

In this embodiment, the actual angular speed of the bucket rod is determined according to the actual location of the controlled point of the first controlled target (for example, the end of the bucket), and the target point is determined according to the actual angular speed of the bucket rod and the preset trajectory of the controlled point of the first controlled target. Then, a speed of a controlled target is calculated according to the target point, which can be ensured that the controlled target is located on the preset trajectory of the controlled point of the first controlled target as much as possible, thereby reducing an error in the movement of the controlled target.

In another embodiment, in step 101, the determining an expected speed direction of a controlled point of a first controlled target according to an actual location of the controlled point of the first controlled target and a preset trajectory of the controlled point of the first controlled target includes: determining a vector from the actual location of the controlled point of the first controlled target to the target point as the expected speed direction of the controlled point of the first controlled target.

In an example, the first controlled target is located at the end of the bucket, then this step may be specifically: determining a vector from the actual location of the end of the bucket to the target point as an expected speed direction of the end of the bucket.

Correspondingly, in step 102, the determining a target speed of at least one controlled target of the plurality of controlled targets according to the expected speed direction of the controlled point of the first controlled target and the kinematic relationship may be specifically: determining an angular speed of the at least one controlled target according to the expected speed direction of the controlled point of the first controlled target and the kinematic relationship between the first controlled target and the remaining controlled targets of the plurality of controlled targets.

The determining an angular speed of the at least one controlled target according to the expected speed direction of the controlled point of the first controlled target and the kinematic relationship between the first controlled target and the remaining controlled targets of the plurality of controlled targets specifically includes:

setting an angular speed of the first controlled target as a first angular speed value; and determining a target angular speed of the at least one controlled target of the plurality of controlled targets by using a Jacobian matrix of the kinematic relationship between the controlled targets, an angular speed of the controlled target, the first angular speed value, and the expected speed direction of the first controlled target.

Specifically, the controlled targets include a bucket, a boom, a bucket rod, and a slewing support of the excavator, and in the case that the slewing support is stationary, the controlled point of the first controlled target is the end of the bucket, and correspondingly, the determining an angular speed of the at least one controlled target according to the expected speed direction of the controlled point of the first controlled target and the kinematic relationship between the first controlled target and the remaining controlled targets of the plurality of controlled targets specifically includes:

setting an angular speed of the bucket as a first angular speed value; and determining target angular speeds of the boom and the bucket rod by using a Jacobian matrix of the kinematic relationship between the controlled targets, an angular speed of the slewing support, the first angular speed value, and the expected speed direction of the end of the bucket.

In this embodiment, the first angular speed value may be determined according to requirements or experience.

Actions of the excavator may be divided into two categories: planar movement and slewing space movement; while typical planar movement includes digging and shoveling the ground; and typical slewing space movement includes slewing loading. During the planar movement, the slewing support of the excavator is stationary with a speed of 0. During the slewing movement, the slewing support of the excavator rotates. Therefore, in the embodiment of the present disclosure, an angular speed of a controlled target of the excavator is calculated to distinguish two cases of whether the slewing support is stationary.

In this embodiment, a quaternary quadratic equation about angular speeds of the slewing support, the boom, the bucket rod, and the bucket and the expected speed direction of the controlled point of the first controlled target may be obtained by using a Jacobian matrix reflecting the kinematic relationship between the controlled targets, the angular speed of the slewing support, the first angular speed value, and the expected speed direction of the controlled point of the first controlled target. The angular speed of the slewing support is known as 0, and the angular speed of the bucket is set, thus unique solutions of target angular speeds of the boom and the bucket can be obtained. In addition, a control parameter value for controlling the bucket and the boom may be further determined according to the unique solutions of the target angular speeds, to improve control accuracy of the excavator.

In this embodiment, the kinematic relationship between the bucket, the boom, the bucket rod, and the slewing support is expressed by the Jacobian matrix of excavator kinematics as follows:

$$J\omega = \begin{bmatrix} J11 & J12 & J13 & J14 \\ J21 & J22 & J23 & J24 \\ J31 & J32 & J33 & J34 \end{bmatrix} [\omega 1 \quad \omega 2 \quad \omega 3 \quad \omega 4]^T = k \begin{bmatrix} a \\ b \\ c \end{bmatrix}.$$

In the foregoing formula, $$\begin{bmatrix} J11 & J12 & J13 & J14 \\ J21 & J22 & J23 & J24 \\ J31 & J32 & J33 & J34 \end{bmatrix}$$

is the Jacobian matrix.

In the foregoing formula, ω1, ω2, ω3, ω4 respectively represents the angular speeds of the slewing support, the boom, the bucket rod, and the bucket.

Data of the Jacobian matrix may be determined according to mechanism parameters of the excavator.

For the planar movement, the slewing support does not move, and the angular speed of the slewing support may be set as: $w_1=0$; the bucket rod is an active mechanism, so correspondingly, $w_3$ is a current angular speed of the bucket rod; the bucket needs to maintain a fixed angle with the horizontal plane during the movement; $w_4$ is selected as a current angular speed of the bucket, and the speed of the end of the bucket may be calculated by using the foregoing formula.

In another embodiment of the present disclosure, the determining a target point, whose distance from the adjacent point is a set distance value, on the preset trajectory of the controlled point of the first controlled target includes:

determining the set distance value according to an actual angular speed of the controlled target; and after rotating a plane, where the at least one controlled target of the plurality of controlled targets is located, by the set distance value, taking an intersecting point of the rotated plane and the preset trajectory of the controlled point of the first controlled target as the target point.

Specifically, the method is applied to an excavator, and the controlled targets include a bucket, a boom, a bucket rod, and a slewing support of the excavator. In the trajectory, in the case that the slewing support is moving, the first controlled target is the bucket; and the determining a target point, whose distance from the closest point is a set distance value, on the preset trajectory of the controlled point of the first controlled target includes:

determining the set distance value according to an actual angular speed of the slewing support; and after rotating a plane, where the bucket, the boom, and the bucket rod are located, by the set distance value, taking an intersecting point of the rotated plane and a preset trajectory of a controlled point of the bucket as the target point.

In this embodiment, in the case that the slewing support is moving, the speed of the slewing support is greater than zero, and the bucket is still taken as the first controlled target when determining the target point. The bucket rod, the boom, and the bucket move with the movement of the slewing support, and the target point is in the rotation direction. Locations of the slewing support, the bucket, the boom, and the bucket rod should be considered when determining the target point, thus the target point can reflect the overall condition of the movement of these four mechanisms, so that the target speed calculated according to the target point is more accurate, which is helpful to make the movement of each controlled target conform to the set trajectory.

In the case that the slewing support is moving, the space slewing movement occurs in the slewing support, the boom, the bucket rod, and the bucket. This example also refers to an operating habit of the human operator. During slewing, a handle for slewing operation remains constant, the slewing support is used as an active mechanism, and the boom and the bucket rod are used as random mechanisms. The boom, the bucket rod, and the bucket of the excavator form a plane, and the target point is an intersecting point of the foregoing plane rotated by an angle of θ and the preset trajectory of the controlled point of the first controlled target. The angle θ is calculated from the actual angle of the slewing support, and parameters k1 and b1 are used to adjust a linear relationship between the angular speed of the slewing support and the rotation angle θ. The calculation formula is as follows:

$$\theta = w_{swing} \times k1 + b1.$$

In another implementation, in step 101, the determining an expected speed direction of a controlled point of a first controlled target according to an actual location of the controlled point of the first controlled target and a preset trajectory of the controlled point of the first controlled target includes: determining a vector from the actual location of the controlled point of the first controlled target to the target point as the expected speed direction of the controlled point of the first controlled target.

Correspondingly, in step 102, the determining a target speed of at least one controlled target of the plurality of controlled targets according to the expected speed direction of the controlled point of the first controlled target and the kinematic relationship is specifically: determining an angular speed of the at least one controlled target according to the expected speed direction of the controlled point of the first controlled target and the kinematic relationship between the first controlled target and the remaining controlled targets of the plurality of controlled targets.

The determining a target speed of at least one controlled target of the plurality of controlled targets according to the expected speed direction of the controlled point of the first controlled target and the kinematic relationship may specifically include:

setting an angular speed of the at least one controlled target other than the first controlled target as a second angular speed value; and determining a target angular speed of the at least one controlled target of the plurality of controlled targets by using a Jacobian matrix of the kinematic relationship between the controlled targets, the second angular speed value, and the expected speed direction of the controlled point of the controlled target.

The method provided in this embodiment is applied to the excavator, the controlled targets include a bucket, a boom, a bucket rod, and a slewing support of the excavator, and in the case that the slewing support is moving, the first controlled target is the bucket; and correspondingly, the determining an angular speed of the at least one controlled target according to the expected speed direction of the controlled point of the first controlled target and the kinematic relationship between the first controlled target and the remaining controlled targets of the plurality of controlled targets may specifically include:

setting an angular speed of the slewing support as a second angular speed value; and determining target angular speeds of the bucket, the boom, and the bucket rod by using a Jacobian matrix of the kinematic relationship between the controlled targets, the second angular speed value, and the expected speed direction of the controlled point of the bucket.

In this embodiment, a quaternary cubic matrix about angular speeds of the bucket, the boom, the bucket rod, and the slewing support and the expected speed direction of the controlled point of the first controlled target may be obtained by using a Jacobian matrix of the kinematic relationship between the controlled targets, the second angular speed value, and the expected speed direction of the controlled point of the first controlled target. After the speed of the slewing support is set, unique solutions of angular speeds of the bucket rod, the bucket, and the boom can be obtained.

In this embodiment, the kinematic relationship between the bucket, the boom, the bucket rod, and the slewing support is expressed by the Jacobian matrix of excavator kinematics as follows:

$$J\omega = \begin{bmatrix} J11 & J12 & J13 & J14 \\ J21 & J22 & J23 & J24 \\ J31 & J32 & J33 & J34 \end{bmatrix} \begin{bmatrix} \omega 1 & \omega 2 & \omega 3 & \omega 4 \end{bmatrix}^T = k \begin{bmatrix} a \\ b \\ c \end{bmatrix}.$$

In the foregoing formula, $$\begin{bmatrix} J11 & J12 & J13 & J14 \\ J21 & J22 & J23 & J24 \\ J31 & J32 & J33 & J34 \end{bmatrix}$$

is the Jacobian matrix.

In the foregoing formula, ω1, ω2, ω3, ω4 represents the angular speeds of the slewing support, the boom, the bucket rod, and the bucket, respectively.

The data of the Jacobian matrix may be determined according to mechanism parameters of the excavator and actual angles of the mechanisms.

For the space slewing movement, the slewing support is taken as an active mechanism, $w_1$ is the current angular speed of the slewing support, the bucket needs to maintain a fixed angle with the horizontal plane during slewing to ensure that materials in the bucket do not leak out, and $w_4$ is the current angular speed of the bucket. After the angular speed of the slewing support is set, the angular speed of the end of the bucket and the angular speeds of the boom and the bucket rod may be calculated through the foregoing formula.

Figure 3:
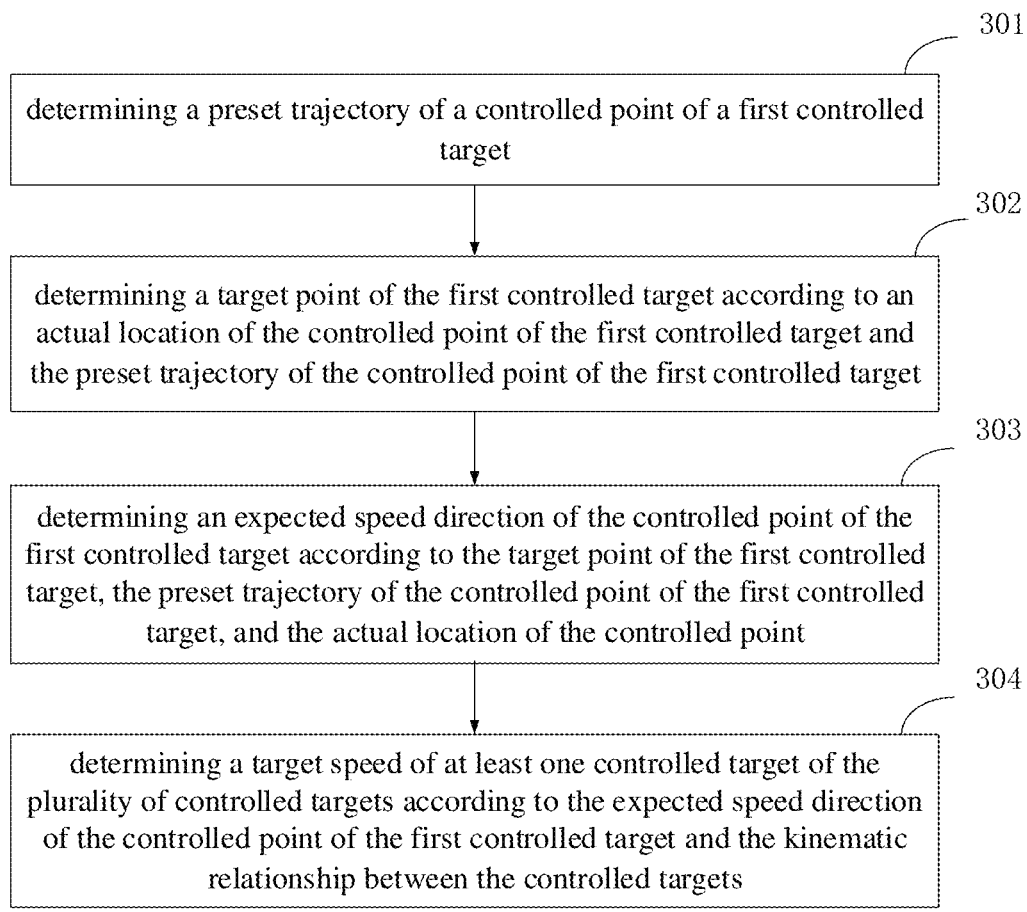
FIG. 3 is a schematic diagram of a speed determination method according to an example of the present disclosure.

In an example, as shown in FIG. 3, the speed determination method also includes:
  step 301, determining a preset trajectory of a controlled point of a first controlled target;
  step 302, determining a target point of the first controlled target according to an actual location of the controlled point of the first controlled target and the preset trajectory of the controlled point of the first controlled target, wherein the first controlled target is one of a plurality of controlled targets having a kinematic relationship;
  step 303, determining an expected speed direction of the controlled point of the first controlled target according to the target point of the first controlled target, the preset trajectory of the controlled point of the first controlled target, and the actual location of the controlled point;
  step 304, determining a target speed of at least one controlled target of the plurality of controlled targets according to the expected speed direction of the controlled point of the first controlled target and the kinematic relationship between the controlled targets.

Figure 4:
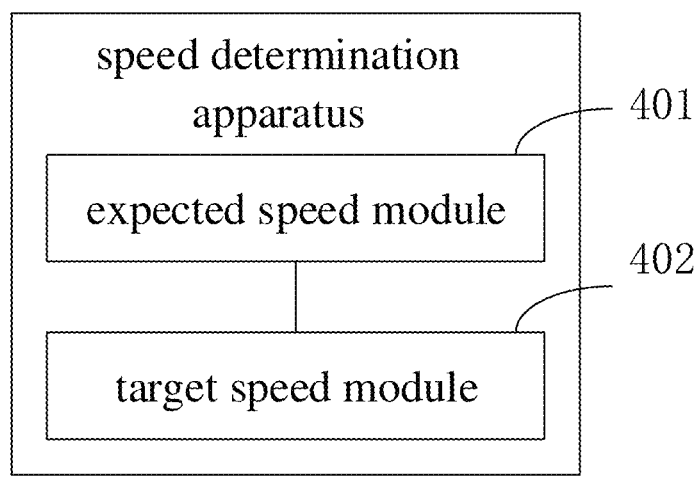
FIG. 4 is a schematic diagram of a speed determination apparatus according to another embodiment of the present disclosure.

An embodiment of the present disclosure also provides a speed determination apparatus, as shown in FIG. 4, including:
  an expected speed module 401, configured to determine an expected speed direction of a controlled point of a first controlled target according to an actual location of the controlled point of the first controlled target and a preset trajectory of the controlled point of the first controlled target, wherein the first controlled target is one of a plurality of controlled targets having a kinematic relationship; and
  a target speed module 402, configured to determine a target speed of at least one controlled target of the plurality of controlled targets according to the expected speed direction of the controlled point of the first controlled target and the kinematic relationship.

Figure 5:
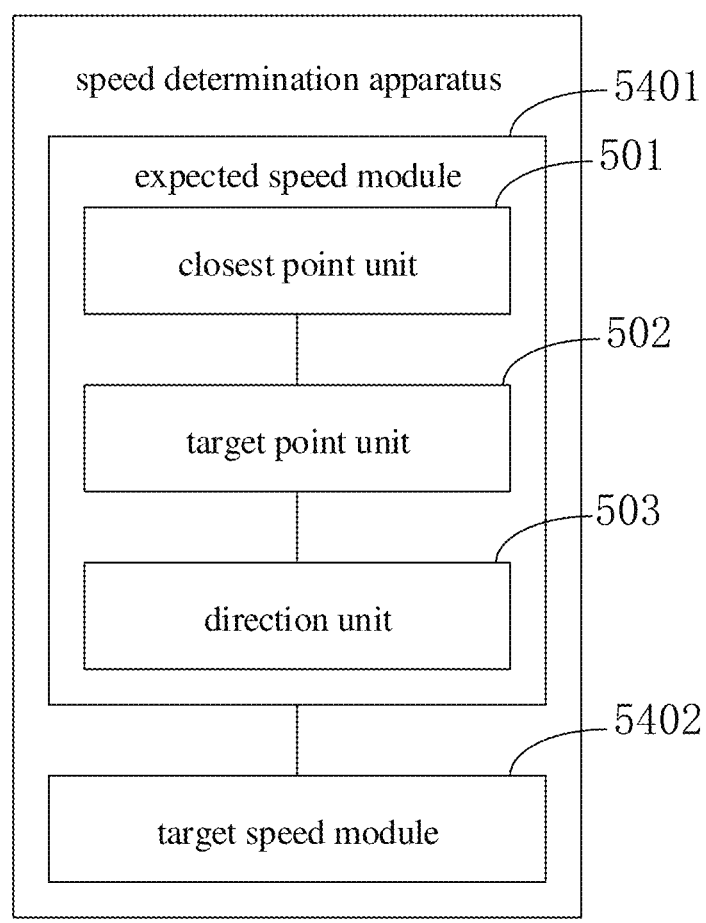
FIG. 5 is a schematic diagram of a speed determination apparatus according to another embodiment of the present disclosure.

In an implementation, as shown in FIG. 5, the speed determination apparatus includes an expected speed module 5401 and an target speed module 5402, which are modules same as or similar to the expected speed module 401 and the target speed module 402 shown in FIG. 4, and on this basis, as shown in FIG. 5, the expected speed module 5401 includes:
  a closest point unit 501, configured to determine an adjacent point, which is closest to the actual location of the controlled point of the first controlled target, on the preset trajectory of the controlled point of the first controlled target;
  a target point unit 502, configured to determine a target point, whose distance from the adjacent point is a set distance value, on the preset trajectory of the controlled point of the first controlled target; and
  a direction unit 503, configured to take a direction of a vector from the actual location of the controlled point to the target point as the expected speed direction of the controlled point of the first controlled target.

The target point unit 502 is further configured to: determine the set distance value according to the actual location of the controlled point of the first controlled target; and determine a point ahead of the adjacent point by the set distance value in a movement direction of the adjacent point on the preset trajectory of the controlled point of the first controlled target as the target point.

The expected speed module 5401 is further configured to determine a vector from the actual location of the controlled point of the first controlled target to the target point as the expected speed direction of the controlled point of the first controlled target; and the target speed module 5402 is further configured to: set an angular speed of the first controlled target as a first angular speed value; and determine a target angular speed of the at least one controlled target of the plurality of controlled targets by using a Jacobian matrix of the kinematic relationship between the controlled targets, an angular speed of the controlled target, the first angular speed value, and the expected speed direction of the controlled point of the first controlled target.

In an implementation, the apparatus is applied to an excavator, the controlled targets include a bucket, a boom, a bucket rod, and a slewing support of the excavator, and in the case that the slewing support is stationary, the first controlled target is the bucket; and
  the target point unit is further configured to:
    determine the set distance value according to an actual location of the end of the bucket; and determine the point ahead of the adjacent point by the set distance value in the movement direction of the adjacent point on the preset trajectory of the end of the bucket as the target point.

In an implementation, the target speed is a target angular speed, and the expected speed module is further configured to:
determining a vector from the actual location of the controlled point of the first controlled target to the target point as the expected speed direction of the controlled point of the first controlled target; and
the target speed module is further configured to:
set an angular speed of the bucket as a first angular speed value; and
determine target angular speeds of the boom and the bucket rod by using a Jacobian matrix of the kinematic relationship between the controlled targets, an angular speed of the slewing support, the first angular speed value, and the expected speed direction of the end of the bucket.

The target point unit is further configured to:
determine the set distance value according to an actual angular speed of the controlled target; and
after rotating a plane, where the at least one controlled target of the plurality of controlled targets is located, by the set distance value, take an intersecting point of the rotated plane and the preset trajectory of the controlled point of the first controlled target as the target point.

The expected speed module is further configured to determine a vector from the actual location of the controlled point of the first controlled target to the target point as the expected speed direction of the controlled point of the first controlled target; and
the target speed module is further configured to:
set an angular speed of the at least one controlled target other than the first controlled target as a second angular speed value; and
determine a target angular speed of the at least one controlled target of the plurality of controlled targets by using a Jacobian matrix of the kinematic relationship between the controlled targets, the second angular speed value, and the expected speed direction of the controlled point of the controlled target.

In an implementation, the apparatus is applied to an excavator, the controlled targets include a bucket, a boom, a bucket rod, and a slewing support of the excavator, and in the trajectory, in the case that the slewing support is moving, the first controlled target is the bucket; and
the target point unit is further configured to:
determine the set distance value according to an actual angular speed of the slewing support; and
after rotating a plane, where the bucket, the boom, and the bucket rod are located, by the set distance value, take an intersecting point of the rotated plane and a preset trajectory of a controlled point of the bucket as the target point.

In an implementation, the expected speed module is further configured to:
determine a vector from an actual location of the controlled point of the bucket to the target point as an expected speed direction of the controlled point of the bucket; and
the target speed module is further configured to:
set an angular speed of the slewing support as a second angular speed value; and
determine target angular speeds of the bucket, the boom, and the bucket rod by using a Jacobian matrix of the kinematic relationship between the controlled targets, the second angular speed value, and the expected speed direction of the controlled point of the bucket.

The function of each module in each apparatus in the embodiments of the present disclosure can refer to the corresponding descriptions in the above method embodiments, and will not be repeated here.

According to embodiments of the present disclosure, the present disclosure also provides an electronic device and a readable storage medium.

Figure 6:
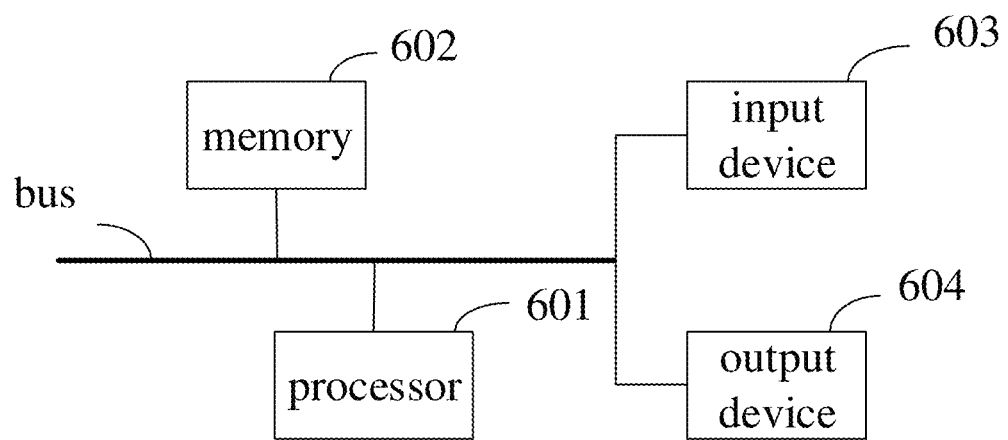
FIG. 6 is a block diagram of an electronic device for implementing a speed determination method according to an embodiment of the present disclosure.

FIG. 6 is a block diagram of an electronic device for implementing a speed determination method according to an embodiment of the present disclosure. The electronic device is intended to represent various forms of digital computers, such as a laptop, a desktop, a workbench, a personal digital assistant, a server, a blade server, a mainframe computer, and other suitable computers. The electronic device may also represent various forms of mobile devices, such as personal digital processing, a cellular phone, a smart phone, a wearable device, and other similar computing devices. The components shown in the present disclosure, their connections and relationships, and their functions are merely examples, and are not intended to limit the implementation described and/or claimed herein.

As shown in FIG. 6, the electronic device includes one or more processors 601, a memory 602, and interfaces for connecting various components, including a high-speed interface and a low-speed interface. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of one processor 601 is shown in FIG. 6.

The memory 602 is a non-transitory computer-readable storage medium provided in the present disclosure. The memory stores instructions executable by at least one processor to cause the at least one processor to execute the method for processing a touch instruction provided herein. The non-transitory computer-readable storage medium of the present disclosure stores computer instructions for causing a computer to execute the method for processing a touch instruction provided herein.

As a non-transitory computer-readable storage medium, the memory 602 may be used to store non-transitory software programs, non-transitory computer-executable programs, and modules, such as program instructions/modules corresponding to the speed determination method in the embodiments of the present disclosure (for example, the expected speed module 401 and the target speed module 402 shown in FIG. 4). The processor 601 executes various functional applications and data processing of the server by running non-transitory software programs, instructions, and modules stored in the memory 602, namely, implementing the speed determination method in the foregoing method embodiment.

The memory 602 may include a program storage area and a data storage area, wherein the program storage area may store an operating system, and an application program required for at least one function; and the data storage area may store data and the like created according to the use of the electronic device for implementing the method for processing a touch instruction. In addition, the memory 620 may include a high speed random access memory, and may also include a non-transitory memory, such as at least one disk storage device, a flash memory device, or other non-transitory solid state storage devices. In some embodiments, the memory 620 may optionally include a memory remotely located with respect to the processor 610, and these remote memories may be connected, via a network, to the electronic device for implementing the method for processing a touch instruction in the embodiment. Examples of such networks may include, but are not limited to, the Internet, an intranet, a local area network, a mobile communication network and combinations thereof.

The foregoing electronic device may further include: an input device 603 and an output device 604. The processor 601, the memory 602, the input device 603, and the output device 604 may be connected by a bus or in other manners. In FIG. 6, connecting by a bus is taken as an example.

The input device 603 may receive input numeric or character information, and generate a key signal input related to a user setting and a function control of the electronic device for implementing the method for processing a touch instruction. For example, the input device may be a touch screen, a keypad, a mouse, a track pad, a touch pad, a pointer stick, one or more mouse buttons, a track ball, a joystick, and other input devices. The output device 640 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e.g., a cathode ray tube (CRT) or a liquid crystal display (LCD) monitor) for displaying information to the user; and a keyboard and a pointing device (e.g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN) and the Internet.

The computer system may include a client and a server. The client and the server are typically remote from each other and typically interact via the communication network. The relationship of the client and the server is generated by computer programs running on respective computers and having a client-server relationship with each other.

In one foregoing embodiment of the present disclosure, due to technical means that the expected speed direction is determined according to the actual location of the controlled point of the first controlled target and the preset trajectory of the controlled point of the first controlled target, and then the target speed of the at least one controlled target is determined according to the expected speed direction, the technical problem that the control accuracy of the controlled targets having a kinematic relationship is difficult to be improved is overcome, and the technical effect of improving control accuracy and device operation efficiency are achieved.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-mentioned implementations are not to be construed as limiting the scope of the present disclosure. It will be apparent to those skilled in the art that various modifications, combinations, sub-combinations and substitutions are possible, depending on design requirements and other factors. Any modifications, equivalent substitutions and improvements, and the like within the spirit and principle of the present disclosure are intended to be included within the scope of the present disclosure.

What is claimed is:

1. A speed determination method, wherein the method is applied to an unmanned excavator, the method comprises:
   determining an expected speed direction of a controlled point of a first controlled target according to an actual location of the controlled point of the first controlled target and a preset trajectory of the controlled point of the first controlled target, wherein the first controlled target is one of a plurality of controlled targets having a kinematic relationship, wherein the plurality of controlled targets comprise a bucket, a boom, a bucket rod, and a slewing support of the unmanned excavator; and determining a target speed of at least one controlled target of the plurality of controlled targets according to the expected speed direction of the controlled point of the first controlled target and the kinematic relationship;

determining a control parameter of the at least one controlled target according to the target speed, and controlling the at least one controlled target according to the control parameter;

wherein the determining an expected speed direction of a controlled point of a first controlled target according to an actual location of the controlled point of the first controlled target and a preset trajectory of the controlled point of the first controlled target comprises:

determining an adjacent point, which is closest to the actual location of the controlled point of the first controlled target, on the preset trajectory of the controlled point of the first controlled target;

determining a target point, whose distance from the adjacent point is a set distance value, on the preset trajectory of the controlled point of the first controlled target; and taking a direction of a vector from the actual location of the controlled point of the controlled target to the target point as the expected speed direction of the controlled point of the first controlled target.

2. The method of claim 1, wherein the determining a target point, whose distance from the adjacent point is a set distance value, on the preset trajectory of the controlled point of the first controlled target comprises:

determining the set distance value according to the actual location of the controlled point of the first controlled target; and determining a point ahead of the adjacent point by the set distance value in a movement direction of the adjacent point on the preset trajectory of the controlled point of the first controlled target as the target point.

3. The method of claim 2, wherein the target speed is a target angular speed, and the determining an expected speed direction of a controlled point of a first controlled target according to an actual location of the controlled point of the first controlled target and a preset trajectory of the controlled point of the first controlled target comprises:

determining the vector from the actual location of the controlled point of the first controlled target to the target point as the expected speed direction of the controlled point of the first controlled target; and the determining a target speed of at least one controlled target of the plurality of controlled targets according to the expected speed direction of the controlled point of the first controlled target and the kinematic relationship comprises:

setting an angular speed of the first controlled target as a first angular speed value; and determining the target angular speed of the at least one controlled target of the plurality of controlled targets by using a Jacobian matrix of the kinematic relationship between the controlled targets, an angular speed of the controlled target, the first angular speed value, and the expected speed direction of the controlled point of the first controlled target.

4. The method of claim 2, wherein in a case that the slewing support is stationary, the controlled point of the first controlled target is an end of the bucket; and the determining a target point, whose distance from the adjacent point is a set distance value, on the preset trajectory of the controlled point of the first controlled target comprises:

determining the set distance value according to an actual location of the end of the bucket; and determining the point ahead of the adjacent point by the set distance value in the movement direction of the adjacent point on the preset trajectory of the end of the bucket as the target point.

5. The method of claim 4, wherein the target speed is a target angular speed, and the determining an expected speed direction of a controlled point of a first controlled target according to an actual location of the controlled point of the first controlled target and a preset trajectory of the controlled point of the first controlled target comprises:

determining the vector from the actual location of the end of the bucket to the target point as an expected speed direction of the end of the bucket; and the determining a target speed of at least one controlled target of the plurality of controlled targets according to the expected speed direction of the controlled point of the first controlled target and the kinematic relationship comprises:

setting an angular speed of the bucket as a first angular speed value; and determining target angular speeds of the boom and the bucket rod by using a Jacobian matrix of the kinematic relationship between the controlled targets, an angular speed of the slewing support, the first angular speed value, and the expected speed direction of the end of the bucket.

6. The method of claim 1, wherein the determining a target point, whose distance from the adjacent point is a set distance value, on the preset trajectory of the controlled point of the first controlled target comprises:

determining the set distance value according to an actual angular speed of the controlled target; and after rotating a plane, where the at least one controlled target of the plurality of controlled targets is located, by the set distance value, taking an intersecting point of the rotated plane and the preset trajectory of the controlled point of the first controlled target as the target point.

7. The method of claim 6, wherein the target speed is a target angular speed, and the determining an expected speed direction of a controlled point of a first controlled target according to an actual location of the controlled point of the first controlled target and a preset trajectory of the controlled point of the first controlled target comprises:

determining the vector from the actual location of the controlled point of the first controlled target to the target point as the expected speed direction of the controlled point of the first controlled target; and the determining a target speed of at least one controlled target of the plurality of controlled targets according to the expected speed direction of the controlled point of the first controlled target and the kinematic relationship comprises:

setting an angular speed of the at least one controlled target other than the first controlled target as a second angular speed value; and determining the target angular speed of the at least one controlled target of the plurality of controlled targets by using a Jacobian matrix of the kinematic relationship between the controlled targets, the second angular speed value, and the expected speed direction of the controlled point of the controlled target.

8. The method of claim 6, wherein in a case that the slewing support is moving, the first controlled target is the bucket; and the determining a target point, whose distance from the adjacent point is a set distance value, on the preset trajectory of the controlled point of the first controlled target comprises:

determining the set distance value according to an actual angular speed of the slewing support; and after rotating a plane, where the bucket, the boom, and the bucket rod are located, by the set distance value, taking an intersecting point of the rotated plane and a preset trajectory of a controlled point of the bucket as the target point.

9. The method of claim 8, wherein the target speed is a target angular speed, and the determining an expected speed direction of a controlled point of a first controlled target according to an actual location of the controlled point of the first controlled target and a preset trajectory of the controlled point of the first controlled target comprises:

determining the vector from an actual location of the controlled point of the bucket to the target point as an expected speed direction of the controlled point of the bucket; and the determining a target speed of at least one controlled target of the plurality of controlled targets according to the expected speed direction of the controlled point of the first controlled target and the kinematic relationship comprises:

setting an angular speed of the slewing support as a second angular speed value; and determining target angular speeds of the bucket, the boom, and the bucket rod by using a Jacobian matrix of the kinematic relationship between the controlled targets, the second angular speed value, and the expected speed direction of the controlled point of the bucket.

10. An electronic device, comprising:
at least one processor; and
a memory communicatively connected with the at least one processor, wherein
the memory stores instructions executable by the at least one processor, and the instructions, when executed by the at least one processor, enable the at least one processor to perform operations of:
determining an expected speed direction of a controlled point of a first controlled target according to an actual location of the controlled point of the first controlled target and a preset trajectory of the controlled point of the first controlled target, wherein the first controlled target is one of a plurality of controlled targets having a kinematic relationship, wherein the plurality of controlled targets comprise a bucket, a boom, a bucket rod, and a slewing support of an unmanned excavator; and
determining a target speed of at least one controlled target of the plurality of controlled targets according to the expected speed direction of the controlled point of the first controlled target and the kinematic relationship;
determining a control parameter of the at least one controlled target according to the target speed, and controlling the at least one controlled target according to the control parameter;
wherein the determining an expected speed direction of a controlled point of a first controlled target according to an actual location of the controlled point of the first controlled target and a preset trajectory of the controlled point of the first controlled target comprises:

determining an adjacent point, which is closest to the actual location of the controlled point of the first controlled target, on the preset trajectory of the controlled point of the first controlled target;

determining a target point, whose distance from the adjacent point is a set distance value, on the preset trajectory of the controlled point of the first controlled target; and taking a direction of a vector from the actual location of the controlled point of the controlled target to the target point as the expected speed direction of the controlled point of the first controlled target.

11. The electronic device of claim 10, wherein the determining a target point, whose distance from the adjacent point is a set distance value, on the preset trajectory of the controlled point of the first controlled target comprises:

determining the set distance value according to the actual location of the controlled point of the first controlled target; and determining a point ahead of the adjacent point by the set distance value in a movement direction of the adjacent point on the preset trajectory of the controlled point of the first controlled target as the target point.

12. The electronic device of claim 11, wherein the target speed is a target angular speed, and the determining an expected speed direction of a controlled point of a first controlled target according to an actual location of the controlled point of the first controlled target and a preset trajectory of the controlled point of the first controlled target comprises:

determining the vector from the actual location of the controlled point of the first controlled target to the target point as the expected speed direction of the controlled point of the first controlled target; and the determining a target speed of at least one controlled target of the plurality of controlled targets according to the expected speed direction of the controlled point of the first controlled target and the kinematic relationship comprises:

setting an angular speed of the first controlled target as a first angular speed value; and determining the target angular speed of the at least one controlled target of the plurality of controlled targets by using a Jacobian matrix of the kinematic relationship between the controlled targets, an angular speed of the controlled target, the first angular speed value, and the expected speed direction of the controlled point of the first controlled target.

13. The electronic device of claim 11, wherein in a case that the slewing support is stationary, the controlled point of the first controlled target is an end of the bucket; and the determining a target point, whose distance from the adjacent point is a set distance value, on the preset trajectory of the controlled point of the first controlled target comprises:

determining the set distance value according to an actual location of the end of the bucket; and determining the point ahead of the adjacent point by the set distance value in the movement direction of the adjacent point on the preset trajectory of the end of the bucket as the target point.

14. The electronic device of claim 13, wherein the target speed is a target angular speed, and the determining an expected speed direction of a controlled point of a first controlled target according to an actual location of the controlled point of the first controlled target and a preset trajectory of the controlled point of the first controlled target comprises:

determining the vector from the actual location of the end of the bucket to the target point as an expected speed direction of the end of the bucket; and the determining a target speed of at least one controlled target of the plurality of controlled targets according to the expected speed direction of the controlled point of the first controlled target and the kinematic relationship comprises:

setting an angular speed of the bucket as a first angular speed value; and determining target angular speeds of the boom and the bucket rod by using a Jacobian matrix of the kinematic relationship between the controlled targets, an angular speed of the slewing support, the first angular speed value, and the expected speed direction of the end of the bucket.

15. A non-transitory computer-readable storage medium storing computer instructions, wherein the computer instructions cause a computer to perform operations of:

determining an expected speed direction of a controlled point of a first controlled target according to an actual location of the controlled point of the first controlled target and a preset trajectory of the controlled point of the first controlled target, wherein the first controlled target is one of a plurality of controlled targets having a kinematic relationship, wherein the plurality of controlled targets comprise a bucket, a boom, a bucket rod, and a slewing support of an unmanned excavator; and determining a target speed of at least one controlled target of the plurality of controlled targets according to the expected speed direction of the controlled point of the first controlled target and the kinematic relationship;

determining a control parameter of the at least one controlled target according to the target speed, and controlling the at least one controlled target according to the control parameter;

wherein the determining an expected speed direction of a controlled point of a first controlled target according to an actual location of the controlled point of the first controlled target and a preset trajectory of the controlled point of the first controlled target comprises:

determining an adjacent point, which is closest to the actual location of the controlled point of the first controlled target, on the preset trajectory of the controlled point of the first controlled target;

determining a target point, whose distance from the adjacent point is a set distance value, on the preset trajectory of the controlled point of the first controlled target; and taking a direction of a vector from the actual location of the controlled point of the controlled target to the target point as the expected speed direction of the controlled point of the first controlled target.

16. The electronic device of claim 15, wherein the determining a target point, whose distance from the adjacent point is a set distance value, on the preset trajectory of the controlled point of the first controlled target comprises:

determining the set distance value according to an actual angular speed of the controlled target; and after rotating a plane, where the at least one controlled target of the plurality of controlled targets is located, by the set distance value, taking an intersecting point of the rotated plane and the preset trajectory of the controlled point of the first controlled target as the target point.

17. The electronic device of claim 16, wherein the target speed is a target angular speed, and the determining an expected speed direction of a controlled point of a first controlled target according to an actual location of the controlled point of the first controlled target and a preset trajectory of the controlled point of the first controlled target comprises:

determining the vector from the actual location of the controlled point of the first controlled target to the target point as the expected speed direction of the controlled point of the first controlled target; and the determining a target speed of at least one controlled target of the plurality of controlled targets according to the expected speed direction of the controlled point of the first controlled target and the kinematic relationship comprises:

setting an angular speed of the at least one controlled target other than the first controlled target as a second angular speed value; and determining the target angular speed of the at least one controlled target of the plurality of controlled targets by using a Jacobian matrix of the kinematic relationship between the controlled targets, the second angular speed value, and the expected speed direction of the controlled point of the controlled target.

18. The electronic device of claim 16, wherein in a case that the slewing support is moving, the first controlled target is the bucket; and the determining a target point, whose distance from the adjacent point is a set distance value, on the preset trajectory of the controlled point of the first controlled target comprises:

determining the set distance value according to an actual angular speed of the slewing support; and after rotating a plane, where the bucket, the boom, and the bucket rod are located, by the set distance value, taking an intersecting point of the rotated plane and a preset trajectory of a controlled point of the bucket as the target point.

* * * * *